(12) United States Patent
Lee et al.

(10) Patent No.: US 11,022,782 B2
(45) Date of Patent: Jun. 1, 2021

(54) IMAGING LENS, AND CAMERA MODULE AND DIGITAL DEVICE COMPRISING SAME

(71) Applicant: LG INNOTEK CO., LTD., Seoul (KR)

(72) Inventors: Sang Hun Lee, Seoul (KR); Young Woon Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 497 days.

(21) Appl. No.: 15/754,924

(22) PCT Filed: Aug. 24, 2016

(86) PCT No.: PCT/KR2016/009347
§ 371 (c)(1),
(2) Date: Feb. 23, 2018

(87) PCT Pub. No.: WO2017/034307
PCT Pub. Date: Mar. 2, 2017

(65) Prior Publication Data
US 2020/0096732 A1    Mar. 26, 2020

(30) Foreign Application Priority Data
Aug. 24, 2015  (KR) .................. 10-2015-0118733

(51) Int. Cl.
*G02B 13/00*   (2006.01)
*G02B 9/64*    (2006.01)
*H04N 5/232*   (2006.01)

(52) U.S. Cl.
CPC ............ *G02B 13/009* (2013.01); *G02B 9/64* (2013.01); *G02B 13/0045* (2013.01); *H04N 5/23245* (2013.01)

(58) Field of Classification Search
CPC .............................. G02B 13/009; G02B 15/02
See application file for complete search history.

(56) References Cited

U.S. PATENT DOCUMENTS

2011/0141576 A1* 6/2011 Seo .................... G02B 13/0045
                                                                 359/683
2011/0235171 A1    9/2011 Dohi et al.
(Continued)

FOREIGN PATENT DOCUMENTS

| CN | 102830485 A | 12/2012 |
| CN | 203825277 U | 9/2014 |

(Continued)

OTHER PUBLICATIONS

International Search Report in International Application No. PCT/KR2016/009347, filed Aug. 24, 2016.
(Continued)

*Primary Examiner* — Darryl J Collins
*Assistant Examiner* — Journey F Sumlar
(74) *Attorney, Agent, or Firm* — Saliwanchik, Lloyd & Eisenschenk

(57) ABSTRACT

An embodiment provides an imaging lens comprising: a body in which a first opening and a second opening are disposed; a first lens group which is disposed on the body and corresponds to the first opening; and a second lens group which is disposed on the body and corresponds to the second opening, wherein the focal distance of the first lens group is greater than 1.8 times and less than 2.1 times the focal distance of the second lens group.

20 Claims, 3 Drawing Sheets

(56) References Cited

U.S. PATENT DOCUMENTS

| | | | |
|---|---|---|---|
| 2013/0016435 A1 | 1/2013 | Tsai | |
| 2014/0340769 A1* | 11/2014 | Shimada | G02B 13/006 359/754 |
| 2016/0062090 A1* | 3/2016 | Kawamura | G02B 15/14 359/686 |

FOREIGN PATENT DOCUMENTS

| | | |
|---|---|---|
| CN | 104597586 A | 5/2015 |
| KR | 10-2005-0051861 A | 6/2005 |
| KR | 10-2011-0024872 A | 3/2011 |
| KR | 10-2014-0031786 A | 3/2014 |
| KR | 10-2015-0070858 A | 6/2015 |
| WO | WO-2012/176379 A1 | 12/2012 |
| WO | WO-2013/039035 A1 | 3/2013 |
| WO | WO-2015/001519 A2 | 1/2015 |

OTHER PUBLICATIONS

Office Action dated Jan. 6, 2020 in Chinese Application No. 201680049265.8.

\* cited by examiner

IMAGING LENS, AND CAMERA MODULE AND DIGITAL DEVICE COMPRISING SAME

CROSS-REFERENCE TO RELATED APPLICATIONS

This application is the U.S. national stage application of International Patent Application No. PCT/KR2016/009347, filed Aug. 24, 2016, which claims priority to Korean Application No. 10-2015-0118733, filed Aug. 24, 2015, the disclosures of each of which are incorporated herein by reference in their entirety.

TECHNICAL FIELD

Embodiments relate to an imaging lens and to a camera module and a digital device comprising the same.

BACKGROUND ART

Conventional film cameras have been replaced with, for example, camera modules for portable terminals, Digital Still Cameras (DSCs), camcorders, and PC cameras (imaging devices attached to personal computers), which use small solid imaging elements such as, for example, CCDs and CMOSs. These imaging devices are becoming much smaller and thinner.

According to this trend, although light-receiving elements, such as Charge Coupled Devices (CCDs), mounted in smaller imaging devices, are being reduced in size, the part that occupies the greatest volume of the imaging device is an imaging lens part.

Accordingly, the constituent element that is becoming the greatest obstacle to realizing smaller and thinner imaging devices is an imaging lens, which forms an image of an object.

A zoom lens is generally used for a camera module for a portable terminal. A zoom lens is a lens that is capable of continuously changing a focal length to zoom in or out with respect to a subject. In order to realize a high zoom magnification and to reduce aberration that occurs in a zoom lens, a plurality of lenses is combined and used for a zoom lens. Therefore, a zoom lens is larger and heavier than a unifocal lens.

As described above, a zoom lens employs a plurality of lenses to realize a high zoom magnification and to reduce aberration that occurs in the zoom lens, which makes it difficult to make a zoom lens optical system smaller and lighter. For example, if the number of lenses is reduced in order to make a zoom lens optical system smaller and lighter, axial chromatic aberration or magnification chromatic aberration may greatly increase.

FIGS. 1 and 2 are views illustrating conventional zoom lenses.

FIG. 1 illustrates an inner-type zoom lens, in which a first lens L1, on which external light is incident, is fixed, and FIG. 2 illustrates a pop-up-type zoom lens, in which the position of a lens, which is disposed at the front side, is changeable. That is, both the zoom lens in FIG. 1 and the zoom lens in FIG. 2 are configured such that the magnification of the lens can be adjusted and zooming in or out with respect to the size of a subject can be achieved by moving the lens.

However, because the movement of the lens group is required in the conventional zoom lenses, the volume of the camera module may increase and power consumption may increase. Further, because the aperture of the optical system decreases in a telephoto mode, brightness and resolution may be degraded.

DISCLOSURE

Technical Problem

Embodiments provide an imaging lens that is capable of reducing the volume and power consumption of a camera module and of improving brightness and resolution in a telephoto mode.

Technical Solution

In one embodiment, there is provided an imaging lens including: a body having a first opening and a second opening formed therein; a first lens group disposed in the body so as to correspond to the first opening; and a second lens group disposed in the body so as to correspond to the second opening, wherein a focal length of the first lens group is greater than 1.8 times a focal length of the second lens group and less than 2.1 times the focal length of the second lens group.

The first lens group may be used in a wide-angle mode, and the second lens group may be used in a telephoto mode.

The first lens group may include first to fifth lenses arranged sequentially in a direction from an object side toward an image side and having refractive power, the first lens, the fourth lens and the fifth lens may have positive refractive power, and the second lens and the third lens may have negative refractive power.

The second lens group may include sixth to tenth lenses arranged sequentially in a direction from an object side toward an image side and having refractive power, the sixth lens and the tenth lens may have positive refractive power, and the seventh lens, the eighth lens and the ninth lens may have negative refractive power.

The imaging lens may satisfy the following equation:

$$0.35 < f6/F < 4.5$$

where, F is a total focal length of the second lens group and f6 is a focal length of the sixth lens.

The sixth lens may be formed such that an absolute value of a radius of curvature of an object surface thereof is smaller than an absolute value of a radius of curvature of an image surface thereof.

A radius of curvature of the sixth lens may be the smallest among radii of curvature of the sixth to tenth lenses.

The imaging lens may satisfy the following equation:

$$N8d < 1.6$$

where, n8d is an index of refraction of the eighth lens on the basis of a d-line.

The imaging lens may satisfy the following equation:

$$20 < v8d < 30$$

where, v8d is an Abbe number of the eighth lens on the basis of a d-line.

The imaging lens may satisfy the following equation:

$$|Ø7| > |Ø9| > |Ø8|$$

where, Ø7 is a reciprocal of an effective focal length of the seventh lens, Ø8 is a reciprocal of an effective focal length of the eighth lens, and Ø9 is a reciprocal of an effective focal length of the ninth lens.

The imaging lens may further include an aperture disposed between the seventh lens and the eighth lens.

An F number of the first lens group may be equal to or greater than an F number of the second lens group.

In another embodiment, there is provided a camera module including: the above-described imaging lens; a filter for selectively transmitting light that has passed through the imaging lens depending on a wavelength of the light; and a light-receiving element for receiving light that has passed through the filter.

The light-receiving element may be an image sensor, and at least one of a horizontal length or a vertical length of a unit pixel of the image sensor may be 2 micrometers or less.

In a further embodiment, there is provided a digital device including the above-described camera module.

Advantageous Effects

Since the imaging lens according to the embodiments includes the first lens group for use in a wide-angle mode and the second lens group for use in a telephoto mode, it is possible to realize a zoom function by selectively using the first lens group and the second lens group without movement of the respective lenses in the first lens group or the second lens group, thereby reducing the volume and power consumption thereof. In addition, since the aperture of the optical system is not decreased in a telephoto mode, it is possible to inhibit degradation of brightness and resolution.

BEST MODE

Hereinafter, embodiments will be described with reference to the accompanying drawings in order to concretely realize the objects as set forth above.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In the following description of the embodiments, "object surface" refers to the surface of a lens that faces the object side on the basis of the optical axis, and "image surface" refers to the surface of the lens that faces the image side on the basis of the optical axis.

In addition, in the embodiments, "+" power of the lens refers to a convergent lens, which converges parallel beams, and "−" power of the lens refers to a divergent lens, which diverges parallel beams.

Figure 1:
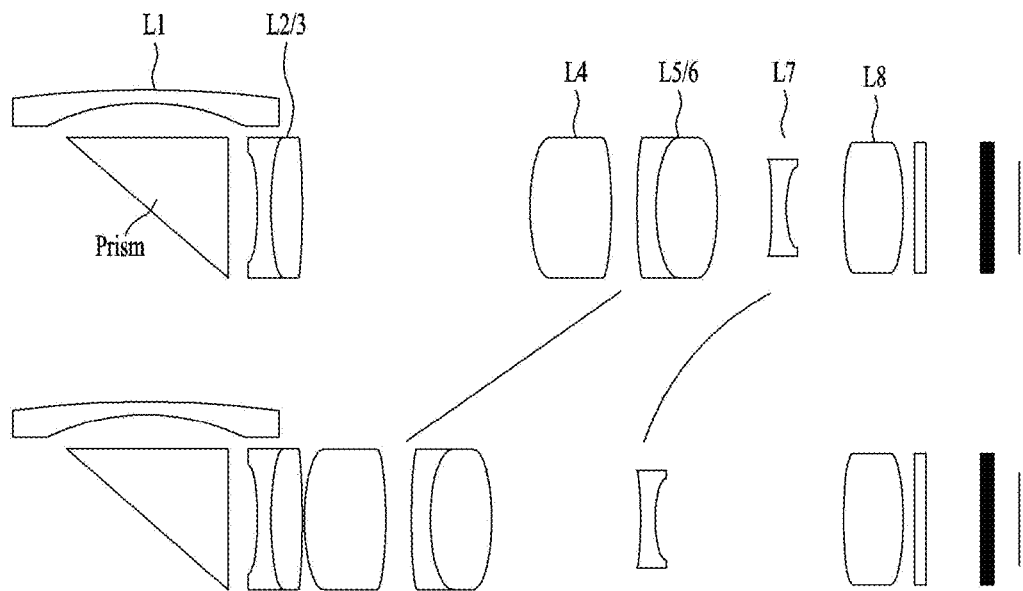
FIGS. 1 and 2 are views illustrating conventional zoom lenses.
Figure 2:
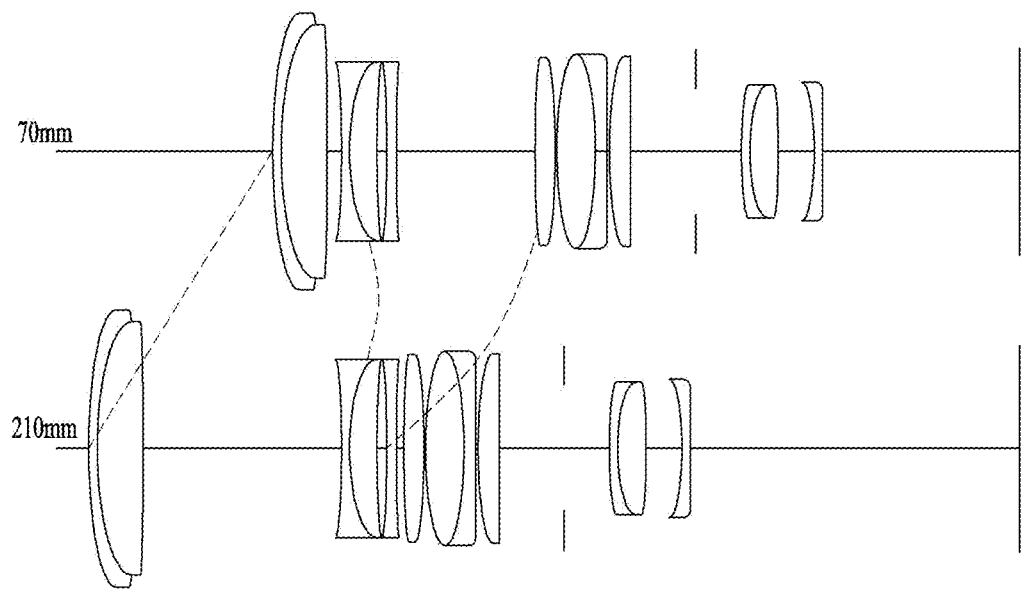
Figure 3A:
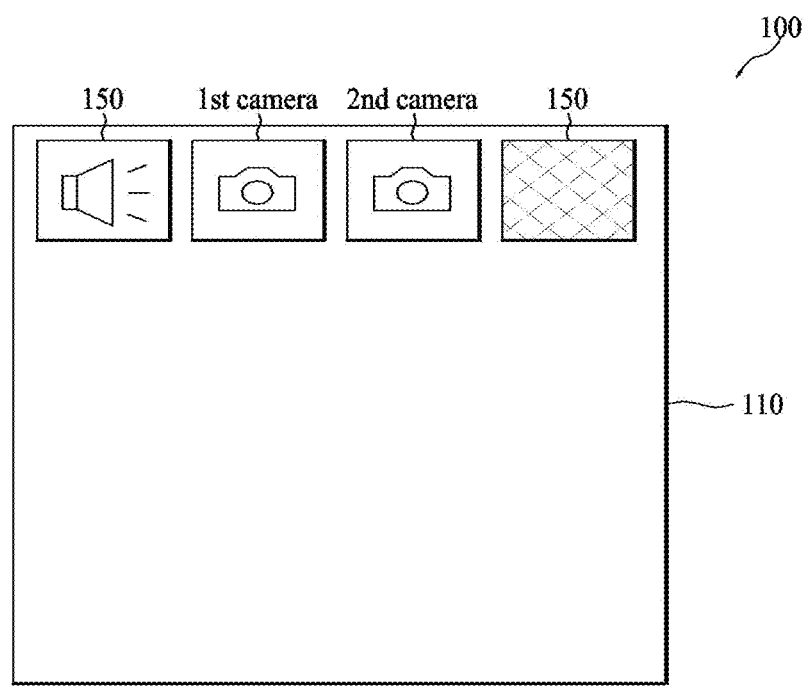
FIG. 3a is a view schematically illustrating a camera module, in which an imaging lens group according to an embodiment is arranged.
Figure 3B:
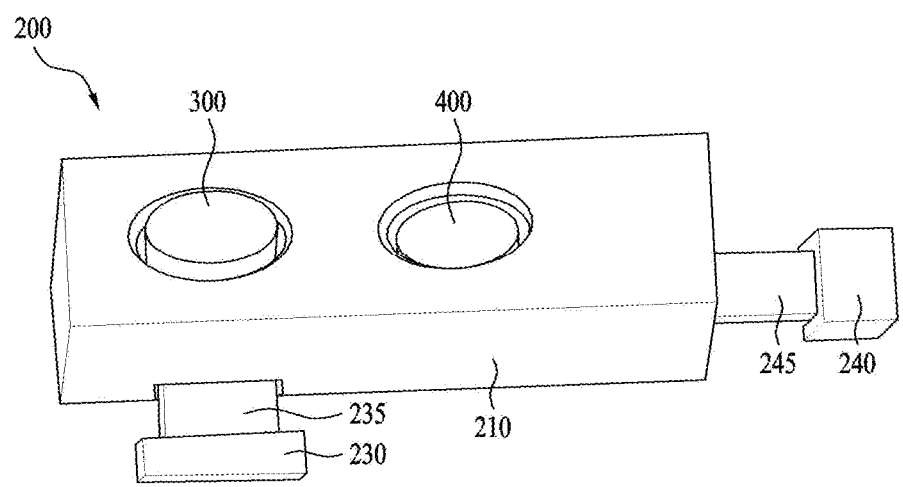
FIG. 3b is a view illustrating a digital device, in which the camera module of FIG. 3a is arranged.

FIG. 3a is a view schematically illustrating a camera module, in which an imaging lens group according to an embodiment is arranged, and FIG. 3b is a view illustrating a digital device, in which the camera module of FIG. 3a is arranged.

The camera module, which includes the imaging lens group according to the embodiment, may be included in a digital device such as a smart phone or the like. For example, as shown in FIG. 3a, a flash 140, a speaker 150, and first and second camera modules ($1^{st}$ camera and $2^{nd}$ camera) may be arranged in a body 110 of a portable device 100.

The camera module 200, as shown in FIG. 3b, has two openings formed in a body 210 thereof. When the two openings are respectively referred to as a first opening and a second opening, a first lens group 300 and a second lens group 400 are respectively arranged in the first opening and the second opening. The first lens group 300 may receive drive signals and current from a first circuit board 230 via first wiring 235, and the second lens group 400 may receive drive signals and current from a second circuit board 240 via second wiring 245.

Figure 4:
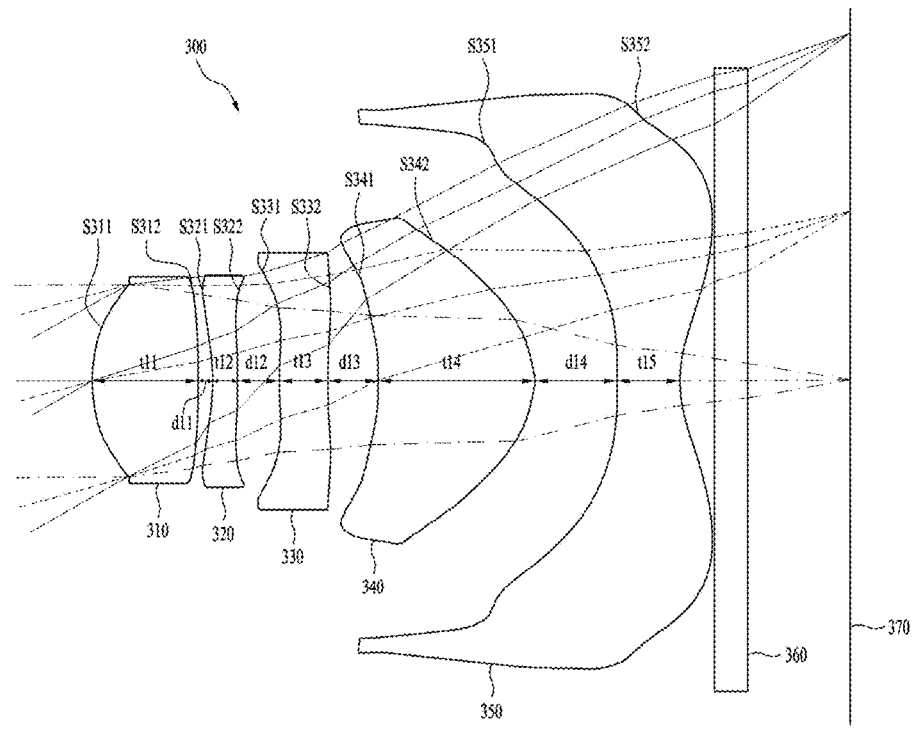
FIGS. 4 and 5 are views illustrating a first lens group and a second lens group in the camera module of FIG. 3b.
Figure 5:
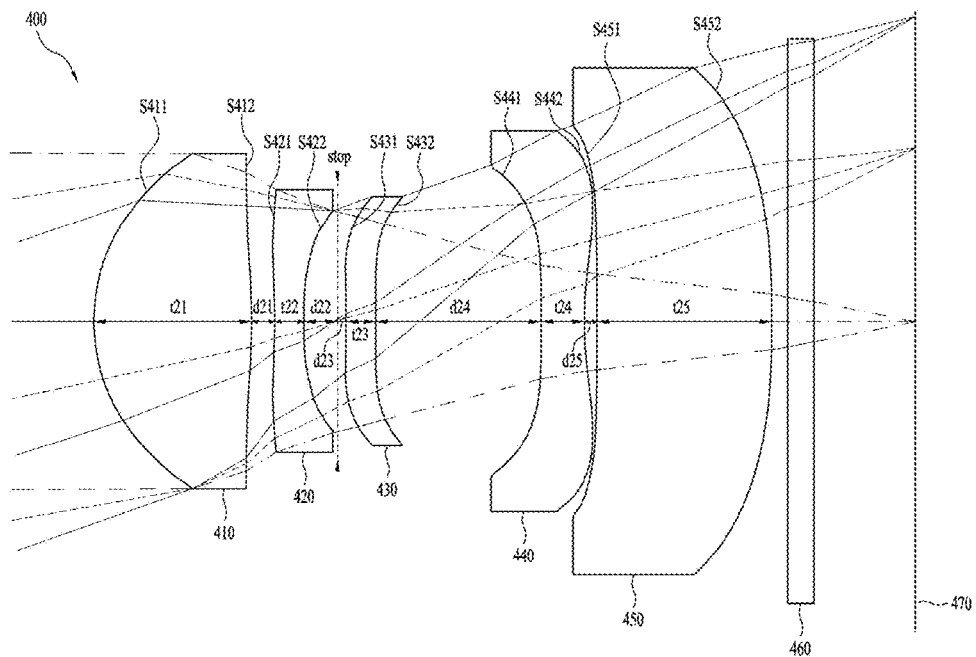

FIGS. 4 and 5 are views illustrating the first lens group and the second lens group in the camera module of FIG. 3b. The mode of the first lens group may be a wide-angle mode, and the mode of the second lens group may be a telephoto mode.

The first lens group 300 includes a first lens 310, a second lens 320, a third lens 330, a fourth lens 340, and a fifth lens 350, which are sequentially arranged in the direction from the object side toward the image side. Although not illustrated, an aperture (stop) may be disposed between the object side and the front side of the first lens 310, and a filter 360 and a light-receiving element 370 may be sequentially arranged at the rear side of the first lens group 300, thereby constituting the imaging lens in the camera module.

In FIG. 4, "S311" may be the object surface of the first lens 310, "S312" may be the image surface of the first lens 310, "S321" may be the object surface of the second lens 320, "S322" may be the image surface of the second lens 320, "S331" may be the object surface of the third lens 330, "S332" may be the image surface of the third lens 330, "S341" may be the object surface of the fourth lens 340, "S342" may be the image surface of the fourth lens 340, "S351" may be the object surface of the fifth lens 350, and "S352" may be the image surface of the fifth lens 350.

The filter 360 may be an optical member having a flat plate shape, such as, for example, an infrared ray filter, a cover glass (not illustrated) may be an optical member such as, for example, a cover glass for the protection of an imaging surface, and the light-receiving element 370 may be an image sensor, which is stacked on a printed circuit board (not illustrated).

In this case, the horizontal and/or vertical length of a unit pixel of the image sensor may be 2 μm (micrometers) or less. The above-described embodiment and subsequently described embodiments may provide imaging lenses that may be applied to camera modules having a high resolution of pixels and/or a large number of pixels, and these camera modules may include an image sensor or a light-receiving element having a high resolution of pixels and/or a large number of pixels. In this case, the horizontal and/or vertical length of the unit pixel may be 2 μm or less.

The first lens 310 may have positive refractive power, the second lens 320 may have negative refractive power, the third lens 330 may have negative refractive power, the fourth lens 340 may have positive refractive power, and the fifth lens 350 may have positive refractive power.

A description of the shapes of the object surfaces and the image surfaces of the above-described first to fifth lenses 310 to 350 will now be made. The first lens 310 may be configured such that the object surface and the image surface thereof are convex. The second lens 320 may have a meniscus shape in which the object surface thereof is concave and the image surface thereof is convex. The third lens 330 may have a meniscus shape in which the object surface thereof is convex and the image surface thereof is concave. The fourth lens 340 may have a meniscus shape in which the object surface thereof is concave and the image surface thereof is convex. The fifth lens 350 may be configured such that the object surface and the image surface thereof are concave.

One embodiment of the above-described first lens group may have the concrete characteristics set forth in the following Table 1.

TABLE 1

|  | Radius of Curvature (mm) | Thickness or Distance (mm) | Index of Refraction/ Abbe Number |
|---|---|---|---|
| Aperture | Infinity | 0 |  |
| First Lens | 1.584 | 0.68 | 1.537 |
|  | −41.890 | 0.10 | 55.7 |
| Second Lens | −2.742 | 0.22 | 1.646 |
|  | −7.795 | 0.22 | 23.3 |
| Third Lens | 4.868 | 0.30 | 1.646 |
|  | 3.899 | 0.39 | 23.3 |
| Fourth Lens | −3.994 | 0.91 | 1.544 |
|  | −1.099 | 0.55 | 56.0 |
| Fifth Lens | −5.644 | 0.29 | 1.537 |
|  | 1.545 |  | 55.7 |

The first lens group 400 illustrated in FIG. 5 includes a sixth lens 410, a seventh lens 420, an eighth lens 430, a ninth lens 440, and a tenth lens 450, which are sequentially arranged in the direction from the object side toward the image side. Although not illustrated, an aperture (stop) may be disposed between the seventh lens 420 and the eighth lens 430, and a filter 460 and a light-receiving element 470 may be sequentially arranged at the rear side of the second lens group 400, thereby constituting the imaging lens in the camera module.

When the aperture is disposed between the seventh lens 420 and the eighth lens 430, the correction of aberrations of the seventh lens 420 and the eighth lens 430, which are disposed at the front and rear sides of the aperture, respectively, may be facilitated.

In FIG. 5, "S411" may be the object surface of the sixth lens 410, "S412" may be the image surface of the sixth lens 410, "S421" may be the object surface of the seventh lens 420, "S422" may be the image surface of the seventh lens 420, "S431" may be the object surface of the eighth lens 430, "S432" may be the image surface of the eighth lens 430, "S441" may be the object surface of the ninth lens 440, "S442" may be the image surface of the ninth lens 440, "S451" may be the object surface of the tenth lens 450, and "S452" may be the image surface of the tenth lens 450.

The filter 460 may include an optical member such as, for example, a cover glass for the protection of an imaging surface, and an optical member having a flat plate shape, such as, for example, an infrared ray filter. The light-receiving element 470 may be an image sensor, which is stacked on a printed circuit board (not illustrated).

The total focal length of the second lens group 400 may be 7 mm, and the F number thereof may be 2.2.

The sixth lens 410 may have positive refractive power, the seventh lens 420 may have negative refractive power, the eighth lens 430 may have negative refractive power, the ninth lens 440 may have negative refractive power, and the tenth lens 450 may have positive refractive power.

A description of the shapes of the object surfaces and the image surfaces of the above-described sixth to tenth lenses 410 to 450 will now be made. The sixth lens 410 may be configured such that the object surface and the image surface thereof are convex. The seventh lens 420 may be configured such that the object surface and the image surface thereof are concave. The eighth lens 430 may have a meniscus shape in which the object surface thereof is concave and the image surface thereof is convex. The ninth lens 440 may have a meniscus shape in which the object surface thereof is convex and the image surface thereof is concave. The tenth lens 450 may be configured such that the object surface and the image surface thereof are convex.

One embodiment of the above-described second lens group may have the concrete characteristics set forth in the following Tables 2 and 3.

TABLE 2

|  | Radius of Curvature (mm) | Thickness or Distance (mm) | Index of Refraction/ Abbe Number |
|---|---|---|---|
| Sixth Lens | 1.925 | 1.37 | 1.544 |
|  | −8.558 | 0.16 | 56.0 |
| Seventh Lens | −8.200 | 0.23 | 1.634 |
|  | 4.763 | 0.24 | 23.9 |
| Aperture | Infinity | 0.10 |  |
| Eighth Lens | −21.526 | 0.23 | 1.544 |
|  | −305.922 | 1.26 | 56.0 |
| Ninth Lens | 42.378 | 0.42 | 1.544 |
|  | 3.350 | 0.10 | 56.0 |
| Tenth Lens | 64.910 | 1.40 | 1.650 |
|  | −12.391 |  | 21.5 |

TABLE 3

|  | K | 4th order | 6th order | 8th order | 10th order | 12th order | 14th order |
|---|---|---|---|---|---|---|---|
| First Lens | 0 | −0.0009 | −0.0025 | 0.0015 | −0.0005 | 0.0000 | 0.0000 |
|  | 0 | 0.0423 | −0.0131 | 0.0018 | −0.0001 | 0.0001 | 0.0000 |
| Second Lens | 0 | 0.0957 | −0.0310 | 0.0050 | −0.0154 | 0.0123 | −0.0027 |
|  | 15.576 | 0.0602 | 0.0509 | −0.0614 | 0.0354 | −0.0155 | 0.0000 |
| Third Lens | 0 | 0.0609 | 0.1213 | −0.0891 | 0.0512 | −0.0182 | 0.0000 |
|  | −4.88416932 | 0.0605 | 0.0985 | −0.1075 | 0.0958 | −0.0363 | 0.0008 |
| Fourth Lens | 0 | −0.0932 | −0.0029 | 0.0109 | −0.0104 | 0.0028 | −0.0003 |
|  | 2.066 | −0.1018 | 0.0167 | −0.0043 | −0.0002 | 0.0003 | −0.0001 |
| Fifth Lens | 0 | −0.0241 | 0.0020 | 0.0010 | −0.0003 | 0.0000 | 0.0000 |
|  | 0 | −0.0188 | 0.0005 | 0.0007 | −0.0002 | 0.0000 | 0.0000 |

In addition, when the total focal length of the second lens group 400 is F and the focal length of the sixth lens 410 is f6, the second
lens group 400 may satisfy the following equation.

$$0.35 < f6/F < 4.5$$

In order to realize a telephoto mode and a smaller camera module, the sixth lens 410 may be configured such that the front surface thereof, i.e. the object surface, has a smaller absolute value of the radius of curvature than the rear surface thereof, i.e. the image surface. Further, since the sixth lens 410 requires a relatively short focal length, the sixth lens 410 may have a smaller radius of curvature than the other lenses.

Here, when the above-described value of f6/F is 0.35 or less, the value of sagittal aberration (sag) of the surface of the lens increases, which may cause difficulty in manufacturing.

In addition, when the index of refraction of the eighth lens 430 on the basis of the d-line is n8d and the Abbe number of the eighth lens 430 on the basis of the d-line is v8d, the second lens group 400 may satisfy the following two equations.

$$n8d < 1.6,\ 20 < v8d < 30$$

A crown-based material, whose refractive index is less than 1.55, may be applied to a lens having positive refractive power, and a flint-based material may be applied to a lens having negative refractive power, so as to facilitate the correction of chromatic aberration.

Since a flint-based material, whose refractive index is greater than 1.55, is used for the eighth lens 430, v8d may be greater than 1.55, which is the Abbe number range of a flint-based material, and the correction of chromatic aberration may therefore be facilitated.

When the negative refractive power of the seventh lens 420, i.e. the reciprocal (1/f7) of the effective focal length of the seventh lens 420, is Ø7, when the negative refractive power of the eighth lens 430, i.e. the reciprocal (1/f8) of the effective focal length of the eighth lens 430, is Ø8, and when the negative refractive power of the ninth lens 440, i.e. the reciprocal (1/f9) of the effective focal length of the ninth lens 440, is Ø9, the second lens group 400 may satisfy the following equation.

$$|Ø7| > |Ø9| > |Ø8|$$

All of the seventh to ninth lenses 420 to 440 have negative refractive power (focal length), the sixth lens 410 and the seventh lens 420 are disposed at the front side of the aperture, and the eighth to tenth lenses 430 to 450 are disposed at the rear side of the aperture. In this case, as described above, when the condition |Ø7|>|Ø9|>|Ø8| is satisfied, the lenses, which are arranged at the front and rear sides of the aperture, may be balanced.

That is, the seventh lens 420, which forms a pair with the sixth lens 410, which has strong positive refractive power, may have an influence on the elongation of the total focal length of the second lens group 400. In addition, the eighth lens 430 and the ninth lens 440, which form a pair with the tenth lens 450, may have a smaller absolute value of refractive power than the seventh lens 420.

Here, since the eighth lens 480 is disposed behind the aperture and serves to correct aberration with respect to the entire field region, it is possible to correct the aforementioned aberration via the change in the shapes of the front surface and the rear surface, rather than via the strong refractive power.

In addition, the F number of the first lens group 300 may be equal to or greater than the F number of the second lens group 400.

Table 4 represents the depth of focus (DOF) when the F number of the first lens group is 2.2.

TABLE 4

| Distance to Object | Far side DOF | Near side DOF |
|---|---|---|
| 3000 | Infinity | 1434 |
| 2000 | 7347 | 1158 |
| 1000 | 1572 | 733 |
| 900 | 1338 | 678 |
| 800 | 1129 | 620 |
| 700 | 939 | 558 |
| 600 | 768 | 492 |
| 500 | 611 | 423 |
| 400 | 468 | 349 |
| 300 | 337 | 270 |
| 200 | 216 | 186 |
| 100 | 104 | 96 |

Table 5 represents the depth of focus (DOF) when the F number of the second lens group is 2.2.

TABLE 5

| Distance to Object | Far side DOF | Near side DOF |
|---|---|---|
| 7000 | Infinity | 4108 |
| 6000 | 15130 | 3742 |
| 5000 | 10057 | 3327 |
| 4000 | 6692 | 2852 |
| 3000 | 4296 | 2305 |
| 2000 | 2504 | 1665 |
| 1000 | 1112 | 909 |
| 800 | 870 | 740 |
| 600 | 639 | 566 |
| 400 | 417 | 385 |
| 200 | 204 | 196 |

Table 6 represents the depth of focus (DOF) when the F number of the second lens group is 3.0.

TABLE 6

| Distance to Object | Far side DOF | Near side DOF |
|---|---|---|
| 7000 | Infinity | 3571 |
| 6000 | 33871 | 3292 |
| 5000 | 15909 | 2966 |
| 4000 | 8861 | 2583 |
| 3000 | 5097 | 2126 |
| 2000 | 2756 | 1570 |
| 1000 | 1159 | 879 |
| 800 | 899 | 721 |
| 600 | 654 | 554 |
| 400 | 423 | 379 |
| 200 | 206 | 195 |

Since the imaging lens according to the embodiments includes the first lens group for use in a wide-angle mode and the second lens group for use in a telephoto mode, it is possible to realize a zoom function by selectively using the first lens group and the second lens group without movement of the respective lenses in the first lens group or the second lens group, thereby reducing the volume and power consumption thereof. In addition, since the aperture of the optical system is not decreased in a telephoto mode, it is possible to inhibit degradation of brightness and resolution.

A camera module including the imaging lens as described above may be mounted in various digital devices such as, for example, digital cameras, smartphones, laptop computers, tablet PCs or the like, and particularly, may be mounted in mobile devices and may realize a high-performance and ultrathin zoom lens.

While the disclosure has been particularly shown and described with reference to exemplary embodiments thereof, these embodiments are only proposed for illustrative purposes and do not restrict the disclosure, and it will be apparent to those skilled in the art that various changes in form and details may be made without departing from the essential characteristics of the embodiments set forth herein. For example, respective configurations set forth in the embodiments may be modified and applied. Further, differences in such modifications and applications should be construed as falling within the scope of the disclosure as defined by the appended claims.

INDUSTRIAL APPLICABILITY

The imaging lens according to the embodiments may be used for a camera module and may reduce the volume and power consumption of the camera module. Since the aperture of the optical system is not decreased in a telephoto mode, degradation of brightness and resolution may be inhibited.

The invention claimed is:

1. An imaging lens comprising:
a body having a first opening and a second opening formed therein;
a first lens group disposed in the body so as to correspond to the first opening; and
a second lens group disposed in the body so as to correspond to the second opening,
wherein a focal length of the first lens group is greater than 1.8 times a focal length of the second lens group and less than 2.1 times the focal length of the second lens group,
wherein the first lens group is not overlapped with the second lens group in an optical axis direction,
wherein the first lens group comprises first to fifth lenses arranged sequentially in a direction from an object side toward an image side and having refractive power, and
wherein the first lens, the fourth lens, and the fifth lens have positive refractive power, and the second lens and the third lens have negative refractive power.

2. The imaging lens according to claim 1, wherein the first lens group is used in a wide-angle mode, and the second lens group is used in a telephoto mode.

3. The imaging lens according to claim 1, wherein an F number of the first lens group is equal to or greater than an F number of the second lens group.

4. An imaging lens comprising:
a body having a first opening and a second opening formed therein;
a first lens group disposed in the body so as to correspond to the first opening; and
a second lens group disposed in the body so as to correspond to the second opening,
wherein a focal length of the first lens group is greater than 1.8 times a focal length of the second lens group and less than 2.1 times the focal length of the second lens group,
wherein the first lens group is not overlapped with the second lens group in an optical axis direction,
wherein the second lens group comprises sixth to tenth lenses arranged sequentially in a direction from an object side toward an image side and having refractive power, and wherein the sixth lens and the tenth lens have positive refractive power, and the seventh lens, the eighth lens, and the ninth lens have negative refractive power.

5. The imaging lens according to claim 4, wherein the imaging lens satisfies the following equation:

$$0.35 < f6/F < 4.5$$

where, F is a total focal length of the second lens group and f6 is a focal length of the sixth lens.

6. The imaging lens according to claim 4, wherein the sixth lens is formed such that an absolute value of a radius of curvature of an object surface thereof is smaller than an absolute value of a radius of curvature of an image surface thereof.

7. The imaging lens according to claim 4, wherein a radius of curvature of the sixth lens is smallest among radii of curvature of the sixth to tenth lenses.

8. The imaging lens according to claim 4, wherein the imaging lens satisfies the following equation:

$$n8d < 1.6$$

where, n8d is an index of refraction of the eighth lens based on a d-line.

9. The imaging lens according to claim 4, wherein the imaging lens satisfies the following equation:

$$20 < v8d < 30$$

where, v8d is an Abbe number of the eighth lens based on a d-line.

10. The imaging lens according to claim 4, wherein the imaging lens satisfies the following equation:

$$|Ø7| > |Ø9| > |Ø8|$$

where, Ø7 is a reciprocal of an effective focal length of the seventh lens, Ø8 is a reciprocal of an effective focal length of the eighth lens, and Ø9 is a reciprocal of an effective focal length of the ninth lens.

11. The imaging lens according to claim 4, comprising:
an aperture disposed between the seventh lens and the eighth lens.

12. The imaging lens according to claim 4, wherein the first lens group is used in a wide-angle mode, and the second lens group is used in a telephoto mode.

13. The imaging lens according to claim 4, wherein an F number of the first lens group is equal to or greater than an F number of the second lens group.

14. A camera module comprising:
an imaging lens comprising a body having a first opening and a second opening formed therein, a first lens group disposed in the body so as to correspond to the first opening, and a second lens group disposed in the body so as to correspond to the second opening, a focal length of the first lens group being greater than 1.8 times a focal length of the second lens group and less than 2.1 times the focal length of the second lens group;
a filter for selectively transmitting light that has passed through the imaging lens depending on a wavelength of the light; and
a light-receiving element for receiving light that has passed through the filter,
wherein the first lens group is not overlapped with the second lens group in an optical axis direction,
wherein the light-receiving element is an image sensor, and
wherein at least one of a horizontal length or a vertical length of a unit pixel of the image sensor is 2 micrometers or less.

15. The camera module according to claim 14, wherein the first lens group is used in a wide-angle mode, and the second lens group is used in a telephoto mode.

16. The camera module according to claim 14, wherein the first lens group comprises first to fifth lenses arranged sequentially in a direction from an object side toward an image side and having refractive power, and wherein the first lens, the fourth lens, and the fifth lens have positive refractive power, and the second lens and the third lens have negative refractive power.

17. The camera module according to claim 14, wherein the second lens group comprises sixth to tenth lenses arranged sequentially in a direction from an object side toward an image side and having refractive power, and wherein the sixth lens and the tenth lens have positive refractive power, and the seventh lens, the eighth lens, and the ninth lens have negative refractive power.

18. The camera module according to claim 17, wherein the imaging lens satisfies the following equation:

$$0.35 < f6/F < 4.5$$

where, F is a total focal length of the second lens group and f6 is a focal length of the sixth lens.

19. The camera module according to claim 17, wherein the sixth lens is formed such that an absolute value of a radius of curvature of an object surface thereof is smaller than an absolute value of a radius of curvature of an image surface thereof.

20. The camera module according to claim 14, wherein an F number of the first lens group is equal to or greater than an F number of the second lens group.

\* \* \* \* \*